US008346586B1

(12) United States Patent
Prakken et al.

(10) Patent No.: US 8,346,586 B1
(45) Date of Patent: Jan. 1, 2013

(54) SYSTEMS AND METHODS FOR ESTIMATING EMPLOYMENT LEVELS

(75) Inventors: Joel L. Prakken, St. Louis, MO (US); Benjamin T. Herzon, Webster Groves, MO (US)

(73) Assignee: Macroeconomic Advisers, LLC, St. Louis, MO (US)

( * ) Notice: Subject to any disclaimer, the term of this patent is extended or adjusted under 35 U.S.C. 154(b) by 434 days.

(21) Appl. No.: 12/640,519

(22) Filed: Dec. 17, 2009

Related U.S. Application Data

(63) Continuation-in-part of application No. 11/797,192, filed on May 1, 2007.

(60) Provisional application No. 60/796,515, filed on May 2, 2006, provisional application No. 60/874,239, filed on Dec. 12, 2006, provisional application No. 61/193,705, filed on Dec. 17, 2008.

(51) Int. Cl.
*G06Q 10/00* (2012.01)
(52) U.S. Cl. .................. 705/7.11; 705/7.12; 705/7.13
(58) Field of Classification Search .......... 705/7.11–7.4; 700/99, 100; 717/114, 136
See application file for complete search history.

(56) References Cited

U.S. PATENT DOCUMENTS

| | | | | |
|---|---|---|---|---|
| 5,189,606 | A * | 2/1993 | Burns et al. ................... | 705/7.23 |
| 5,884,275 | A * | 3/1999 | Peterson et al. .............. | 705/7.34 |
| 6,564,190 | B1 * | 5/2003 | Dubner ....................... | 705/36 R |
| 6,611,726 | B1 * | 8/2003 | Crosswhite ................... | 700/99 |
| 7,480,659 | B2 * | 1/2009 | Chmura et al. ................. | 1/1 |
| 7,809,622 | B1 * | 10/2010 | Fitch et al. .................... | 705/35 |
| 2003/0097342 | A1 * | 5/2003 | Whittingtom ................ | 705/75 |
| 2003/0187770 | A1 * | 10/2003 | Kamiryo ...................... | 705/35 |
| 2005/0125259 | A1 * | 6/2005 | Annappindi .................. | 705/4 |
| 2005/0182646 | A1 * | 8/2005 | Gilmore ....................... | 705/1 |
| 2006/0085455 | A1 * | 4/2006 | Chmura et al. ............... | 707/100 |
| 2006/0117303 | A1 * | 6/2006 | Gizinski ...................... | 717/136 |
| 2006/0212339 | A1 * | 9/2006 | Hubbard et al. .............. | 705/10 |
| 2008/0140514 | A1 * | 6/2008 | Stenger ........................ | 705/10 |

OTHER PUBLICATIONS

Abowd, J. M., Stephens, B. E. and Vilhuber, L. (2005). Confidentiality protection in the Census Bureau's Quarterly Workforce Indicators, presented at the joint statistical meetings 2005, Minneapolis, MN., U.S. Census Bureau, LEHD and Cornell University.*

(Continued)

*Primary Examiner* — Romain Jeanty
*Assistant Examiner* — Alan S Miller
(74) *Attorney, Agent, or Firm* — Finnegan, Henderson, Farabow, Garrett & Dunner, LLP

(57) ABSTRACT

A method of estimating an employment level receiving a first set of payroll data that includes at least one payroll record associated with at least one entity and identifying a format associated with the at least one payroll record of the first plurality of payroll data. The format associated with the at least one payroll record of the first plurality of payroll data may be normalized to substantially conform to a format associated with a second set of payroll data. A regression coefficient associated with the normalized first set of payroll data may be calculated. An employment level is estimated based on the first set of normalized payroll data and the regression coefficient. The regression coefficient comprises a value indicative of a difference in growth rates between the first set of payroll data and the second set of payroll data and is based at least on a number of initial unemployment claims filed during a portion of a time period associated with the first set of payroll data.

26 Claims, 10 Drawing Sheets

OTHER PUBLICATIONS

Card, David and Kruger, Alan. "A Reanalysis of the Effect of the New Jersey Minimum Wage Increase on the Fast-Food Industry with Representative Payroll Data." NBER Working Paper No. 6386, Princeton University, Jan. 1998.*

Philip Hans Franses, Richard Paapa, Bjorn Vroomen ("Forecasting unemployment using an autoregression with censored latent effects parameters" International Journal of Forecasting 20 (2004) 255-271.*

Alan R Montgomery; Victor Zarnowitz; Ruey S Tsay; George C Tiao "Forecasting the U.S. unemployment rate", Journal of the American Statistical Association; Jun. 1998; 93, 442; ABI/INFORM Global p. 478.*

Saeed Moshiri and Laura Brown ("Unemployment Variation over the Business Cycles: a Comparison of Forecasting Models" Journal of Forecasting. Forecast. 23, 497-511 (2004).*

* cited by examiner even though
SYSTEMS AND METHODS FOR ESTIMATING EMPLOYMENT LEVELS This application is a continuation-in-part of copending U.S. application Ser. No. 11/797,192, filed May 1, 2007, which claims the benefit of priority under 35 U.S.C. §119(e) of U.S. Provisional Application Nos. 60/796,515 and 60/874,239, filed May 2, 2006 and Dec. 12, 2006, respectively, and claims the benefit of priority under 35 U.S.C. §119(e) of U.S. Provisional Application No. 61/193,705, filed Dec. 17, 2008, all of which are incorporated herein by reference in their entirety.

TECHNICAL FIELD

The present disclosure relates generally to estimating a monthly national non-farm private employment level and, more particularly, to estimating and/or predicting the national monthly employment level in advance of the release of the *Employment Situation*, which is published by the Bureau of Labor and Statistics (BLS).

BACKGROUND

The BLS conducts monthly surveys from which data are collected to estimate the total national private non-farm employment situation each month. This monthly estimate is published and made readily available to the public in a report referred to as the "Employment Situation." This BLS report includes historical labor statistics as well. The methods of data collection and estimating used by the BLS are readily available to the public. Participation in the monthly surveys is voluntary and the ultimate response rate typically varies between 83 and 87 percent. The BLS calculates an initial estimate of national employment with a response rate of about 60 percent and two subsequent revisions as additional responses are received. In addition, each second revision is further revised annually based on near census data, which is independent of the survey data. Currently, surveys are sent to approximately 160,000 business entities comprising some 400,000 establishments employing 50 million workers.

Employment estimates have implications on a vast range and number of economic factors including, for example, production, trading, and construction. The BLS estimates of employment may, for example, signal future changes in monetary policy. Employment estimates have direct intrinsic information value as well. Hence, information that helps analysts estimate monthly changes in employment is valuable.

Employment statistics are intrinsically important and are used by a multitude of economic forces, not only nationally but internationally as well. The Employment Situation by the BLS is the first release of U.S. government-sponsored economic data every month. In today's fast-paced economies, businesses may desire an estimate of monthly national employment before release of the Employment Situation to make business decisions. Moreover, the BLS' Employment Situation does not provide a breakdown of the monthly employment estimate by establishment size.

An estimate of private non-farm employment based on a data set which is independent from the data used to produce the BLS employment estimate with the derivation of that estimate could meet the need for additional, timely, and accurate estimates of movements in the national labor market for use among economists, financial professionals, government policymakers, and academics. This estimate could be used as a validation of, or forecast for, the Employment Situation and as its own separate economic indicator.

Accordingly, there is a need for a system that assists businesses and other entities in making critical business decisions independent of and/or in advance of the BLS release of the Employment Situation. Such a system may also be sufficiently versatile to enable users to identify, extract, analyze, and derive other information that is currently not available or accessible by the Employment Situation.

SUMMARY OF THE DISCLOSURE

The present disclosure is directed to, for example, a processor-implemented method of an estimating employment level. The method may comprise receiving, at a processor, a first set of payroll data that includes at least one payroll record associated with at least one entity and determining, at the processor, a format associated with the at least one payroll record of the first plurality of payroll data. The format associated with the at least one payroll record of the first plurality of payroll data may be normalized to substantially conform to a format associated with a second set of payroll data. A regression coefficient associated with the normalized first set of payroll data may be calculated, and an employment level may be estimated based on the first set of normalized payroll data and the regression coefficient. The regression coefficient may comprise a value indicative of a difference in growth rates between the first set of payroll data and the second set of payroll data and may be based at least on a number of initial unemployment claims filed during a portion of a time period associated with the first set of payroll data.

The present disclosure is also directed to a calculator for estimating employment level comprising a storage device configured to store a first set of payroll data, the first set of payroll data including at least one payroll record associated with at least one entity and a processor communicatively coupled to the storage device. The processor may be configured to normalize a format associated with the at least one payroll record of the first plurality of payroll data to substantially conform to a format associated with a second set of payroll data. The processor may also be configured to calculate a regression coefficient associated with the normalized first set of payroll data. An employment level may be estimated based on the first set of normalized payroll data and the regression coefficient. The processor may be configured to store the estimated employment level in the storage device. The regression coefficient comprises at least a value indicative of a difference in growth rates between the first set of payroll data and the second set of payroll data and is based, at least in part, on a number of initial unemployment claims filed during a portion of a time period associated with the first set of payroll data.

The present disclosure is further directed to a computer-readable medium for use on a computer system, the computer-readable medium having computer-executable instructions for performing a method for estimating an employment level. The method comprises receiving a first set of payroll data that includes at least one payroll record associated with at least one entity and determining a format associated with the at least one payroll record of the first plurality of payroll data. The method also comprises normalizing the format associated with the at least one payroll record of the first plurality of payroll data to substantially conform to a format associated with a second set of payroll data. A regression coefficient associated with the normalized first set of payroll data may be calculated. An employment level is estimated based on the first set of normalized payroll data and the regression coefficient. The regression coefficient comprises a value indicative of a difference in growth rates between the first set of payroll data and the second set of payroll data and is based, at least in part, on a number of initial unemployment claims filed during a portion of a time period associated with the first set of payroll data.

In accordance with one aspect of the present disclosure, a method is provided which estimates monthly private non-farm employment from a dataset independent of the BLS survey. An exemplary source of a dataset independent of the BLS survey is a private source of payroll data. Such an exemplary source of employment data may be automated, may be acquired from processed payrolls, and/or may not rely on surveys. Such private source of payroll data is "scrubbed" by the independent private entity that provided the private source payroll data. As such, private source payroll data is typically free of confidential and personal data prior to performing the employment analysis and prediction methods described herein.

An exemplary method of estimating a monthly national employment consistent with the present disclosure includes: using (first) raw data which are independent of second monthly employment data; assigning industry codes to each of raw data samples; defining establishment size classes; assigning size classes to each sample; matching samples; calculating matched sample growth rates; filtering outliers of matched sample growth rates; calculating relative size weights of second monthly employment data by linearly interpolating the size distribution of an annual second monthly employment estimate data; calculating seasonal factors and trend cycle components; seasonally adjusting the matched sample growth rates; regressing the matched sample growth rates of the raw data upon a current second monthly employment growth rate using the relative size weights; applying the regression coefficient to a sum of the matched sample growth rates and an historical average growth rate of the raw data; and adding an historical second monthly employment estimate average growth rate.

According to another exemplary embodiment, a method of predicting a monthly employment estimate includes stratifying historical second monthly employment estimates to defined size classes, and predicting a current second monthly employment estimate for each defined class size.

In still another exemplary embodiment, a method of estimating monthly employment includes normalizing the raw data to a specific day of the month.

Additional objects and advantages of the present disclosure will be set forth, in part, in the description which follows, and, in part, will be obvious from the description, or may be learned by practice of the processes and methods described in the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, or of the embodiments of the disclosure described in the claims.

BRIEF DESCRIPTION OF THE DRAWINGS

The accompanying drawings, which are incorporated in, and constitute a part of, this specification, illustrate several exemplary embodiments described in the disclosure and together with the description, serve to explain the principles of the embodiments described in the disclosure.

DETAILED DESCRIPTION

Reference will now be made in detail to the exemplary embodiments described in the disclosure, examples of which are illustrated in the accompanying drawings.

As explained, the BLS publishes the Employment Situation based on the results from surveys to 160,000 business entities, at 400,000 establishments covering 50 million workers. Participation in the survey is voluntary and the survey is typically completed manually. The source of the information that is entered into the survey is not recorded. The BLS' survey asks participants to record one number reflecting how many people were either working for the establishment or paid by the establishment on the 12th of the month.

The BLS stratifies the acquired survey data into the North American Industrial Classification System (NAICS), 6 digit industry codes. The survey data is not categorized by establishment size.

However, the BLS annually constructs a monthly employment estimate which is further stratified by establishment size as well as industry classification and publishes this estimate in the Quarterly Census of Employment and Wages (QCEW), usually in March. As the name implies, the Quarterly Census data is acquired from mandatory tax reports, as opposed to the voluntary monthly surveys. The quarterly reports of state employment security agencies for private industry in combination with quarterly reports by Federal, State, and local governments provide a virtual census (97.1 percent in 2001) of private non-farm employees. Jobs that are exempt or otherwise not covered by unemployment insurance are not included in the QCEW tabulations.

Figure 1:
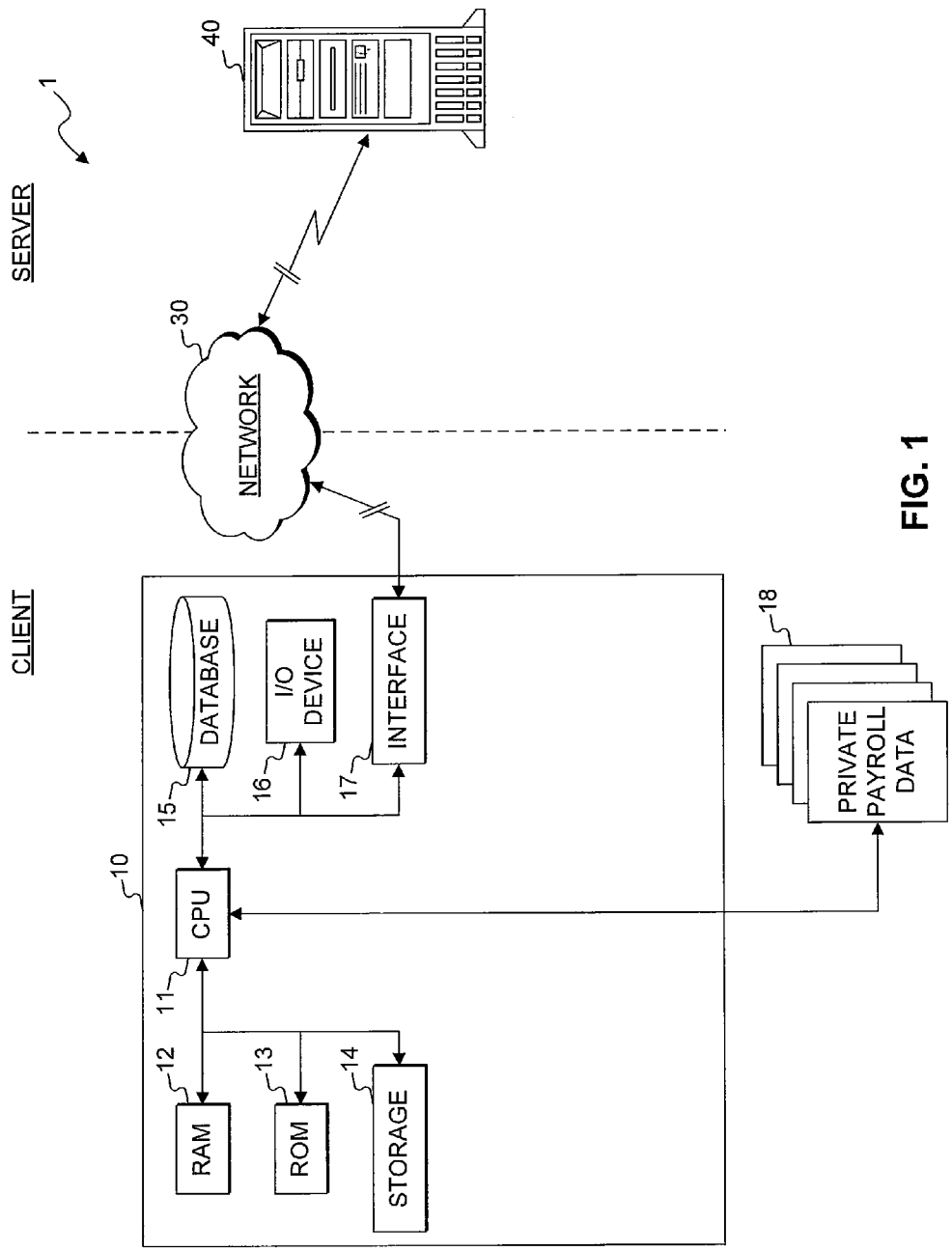
FIG. 1 illustrates a system in which processes and method consistent with the disclosed embodiments may be implemented.

FIG. 1 illustrates an exemplary system 1 in which processes and methods consistent with the disclosed embodiments may be implemented. Computer environment 1 may embody any type of network that includes one or more computer systems communicatively coupled to a communication network 30. According to one exemplary embodiment, system 1 may include at least one user computing system 10 associated with one or more users or groups of users of computer environment 1. System 1 may also include a server 40 communicatively coupled to the at least one user computing system 10 via communication network 30.

Computing system 10 may include a processor-based system on which processes and methods consistent with the disclosed embodiments may be implemented. For example, as illustrated in FIG. 1, user computing system 10 may include one or more hardware and/or software components configured to execute software programs, such as software for estimating an employment level associated with one or more economic markets. For example, user computing system 10 may include one or more hardware components such as a central processing unit (CPU) 11, a random access memory (RAM) module 12, a read-only memory (ROM) module 13, a storage system 14, a database 15, one or more input/output (I/O) devices 16, and a network interface 17.

Alternatively and/or additionally, user computing system 10 may include one or more software components such as a computer-readable medium including computer-executable instructions for performing methods consistent with the disclosed embodiments. It is contemplated that one or more of the hardware components listed above may be implemented using software. For example, storage 14 may include a software partition associated with one or more other hardware components of user computing system 10. User computing system 10 may include additional, fewer, and/or different components than those listed above. It is understood that the components listed above are exemplary only and not intended to be limiting.

CPU 11 may include one or more processors, each configured to execute instructions and process data to perform one or more functions associated with user computing system 10. As illustrated in FIG. 1, CPU 11 may be communicatively coupled to RAM 12, ROM 13, storage 14, database 15, I/O devices 16, and network interface 17. CPU 11 may be configured to execute sequences of computer program instructions to perform various processes, which will be described in detail below. The computer program instructions may be loaded into RAM 12 for execution by CPU 11.

RAM 12 and ROM 13 may each include one or more devices for storing information associated with an operation of user computing system 10 and/or CPU 11. For example, ROM 13 may include a memory device configured to access and store information associated with user computing system 10, including information for identifying, initializing, and monitoring the operation of one or more components and subsystems of user computing system 10. RAM 12 may include a memory device for storing data associated with one or more operations of CPU 11. For example, ROM 13 may load instructions into RAM 12 for execution by CPU 11.

Storage 14 may include a mass storage device configured to store information that CPU 11 may need to perform processes consistent with the disclosed embodiments. For example, storage 14 may include one or more magnetic and/or optical disk devices, such as hard drives, CD-ROMs, DVD-ROMs, or any other type of mass media device.

Database 15 may include one or more software and/or hardware components that cooperate to store, organize, sort, filter, and/or arrange data used by user computing system 10 and/or CPU 11. For example, database 15 may include a data file storage repository on which payroll data associated with one or more private sources of payroll may be stored and organized. It is contemplated that database 15 may store additional and/or different information than that listed above.

I/O devices 16 may include one or more components configured to communicate information with a user associated with user computing system 10. For example, I/O devices 16 may include a console with an integrated keyboard and mouse to allow a user to input parameters associated with user computing system 10. I/O devices 16 may also include a display including a graphical user interface (GUI) for outputting information on a monitor. I/O devices 16 may also include peripheral devices such as, for example, a printer for printing information associated with user computing system 10, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Network interface 17 may include one or more components configured to transmit and receive data via a communication network, such as the Internet, a local area network, a workstation peer to peer network, a direct link network, a wireless network, or any other suitable communication platform. In this manner, user computing system 10 and server 40 may communicate through the use of a network architecture (not shown). In such an embodiment, the network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. For example, network interface 17 may include one or more modulators, demodulators, multiplexers, demultiplexers, network communication devices, wireless devices, antennas, modems, and any other type of device configured to enable data communication via a communication network.

Server 40 may embody a computer system or electronic device associated with a subscriber of data generated by computing system 10. For example, server 40 may be associated with one or more subscriber entities enrolled to receive a payroll estimate calculated by computing system 10. Alternatively, server 40 may comprise a remote user that securely and remotely logs in to computing system 10 via network 30 to access information stored on computing system 10 and/or to conduct payroll estimation calculations remotely. According to yet another alternative embodiment, server 40 may embody a computer system associated with an independent payroll service provider that provides a private source of payroll data 18 to computing system 10.

It is contemplated that, as an alternative or in addition to computing system 10, certain embodiments may include a specially constructed apparatus such as, for example, an employment estimator, predictor, and/or calculator, which may be configured using a general purpose computer system in combination with a particular executable computer program configured to perform only the functions described herein in connection with the remaining figures (at least at times determined by a user). Such a specialized employment calculation tool may be specifically configured to receive private source payroll data and automatically perform methods consistent with the disclosed embodiments, with or without interaction by an external user.

Figure 2:
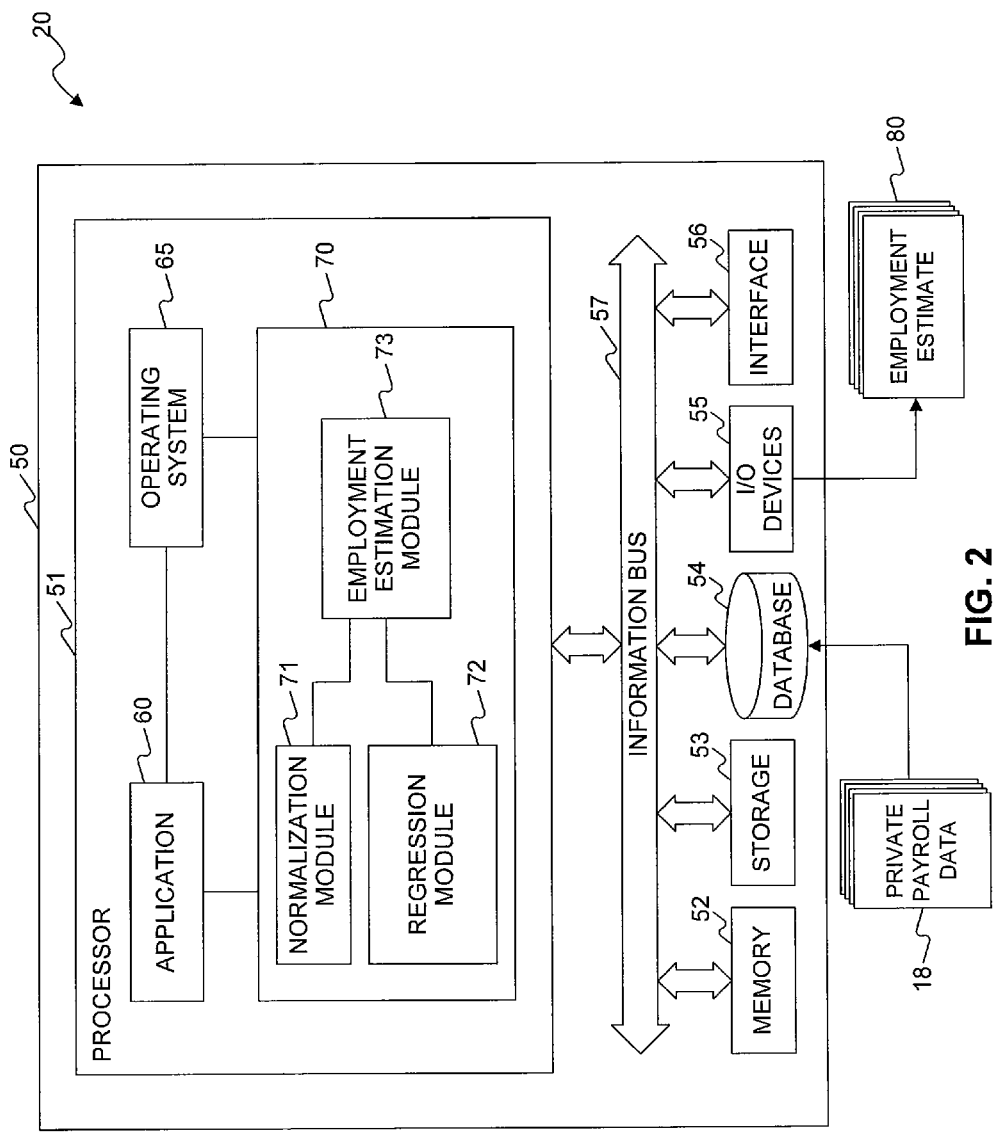
FIG. 2 illustrates an exemplary employment estimation system, which contains components and modules that cooperate to invoke employment estimation processes consistent with the disclosed embodiments.

FIG. 2 illustrates an exemplary employment estimation system 20, on which the processes and methods consistent with the disclosed embodiments may be implemented. As illustrated in FIG. 2, employment estimation system 20 may include a platform 50. Platform 50 may embody a specially constructed apparatus designed specifically to perform at least a portion of the employment estimation processes described herein. Alternatively, platform 50 may embody a general purpose computer that is programmed to perform at least a portion of the disclosed employment estimation processes.

Platform 50 may include a plurality of components, each of which may be implemented in application-specific hardware, in software code that, when executed, invokes certain processor-executable processes, or in a combination of hardware and software that performs the employment estimation processes described herein. For instance, platform 50 may include a processor 51, memory device(s) 52, storage device(s) 53, database(s) 54, input/output (I/O) device(s) 55, and interface(s) 56, each of which is similar in form and function to the respective corresponding element associated with computing system 10 of FIG. 1. Processor 51, memory device(s) 52, storage device(s) 53, database(s) 54, I/O device(s) 55, and interface(s) 56 may be communicatively coupled to each of the other components of platform 50 via information bus 57, which provides a common communication bus for platform 50. Accordingly, information received and/or collected at one or more of the components of platform 50 may be made readily available to one or more of the other components. For example, private payroll data 18 received at database 54 may be provided to (or accessed by) processor 51, via information bus 57.

Processor 51 may include application(s) 60, operating system(s) 65, and method invoking component 70. Application 60 may include software programs configured to operate with and/or take advantage of features provided by processes and methods consistent with the disclosed embodiments. Operating system 65 may comprise one or more standard or customized software systems that define the operational behavior of processor 51.

Method invoking component 70 may include one or more components 71, 72, 73 or "modules" that, when prompted by processor 51 and/or one or more applications 60, perform specific processes in accordance with predefined instructions associated with the respective component. According to one embodiment, method invoking component 70 may include a normalization module 71, a regression module 72, and an employment estimation module 73.

Normalization module 71 may include hardware-programmable elements, software-programmable elements, or a combination of hardware- and software-programmable elements that perform data normalization processes consistent with the disclosed embodiments. Such normalization processes include, for example, filtering, formatting, stratification, coding, and time normalization of private source payroll data, all of which are described in greater detail below. These normalization processes ensure that the payroll data derived from private source payroll services conform to a format sufficient to estimate and/or predict employment levels in a manner that is comparable with the methodology implemented in the BLS estimate.

Regression module 72 comprises hardware-programmable, software-programmable, or a combination of hardware- and software-programmable elements that analyze, detect, and mitigate the effects of certain sources of bias in the private source of payroll data, as will be discussed in greater detail below. According to one embodiment, regression module 72 may include software-programmable hardware that is configured to execute process instructions for detecting one or more sources of bias in private source payroll data, determining an error or difference value caused by the one or more sources of bias, and calculate a regression coefficient for compensating for and/or otherwise mitigating the effects of the one or more sources of bias. As an alternative to software-programmable hardware, regression module 72 may include application-specific hardware that is configured to perform the regression coefficient calculation processes described herein, with or without the use of software.

Employment estimation module 73 comprises hardware-programmable, software-programmable, or a combination of hardware- and software-programmable elements that predicts employment levels based at least in part on data output from normalization module 71 and regression module 72, as will be discussed in greater detail below. According to one embodiment, employment estimation module 73 may include software-programmable hardware that is configured to calculate an estimate of periodic employment based on a number of factors, as described hereafter. As an alternative to software-programmable hardware, employment estimation module 73 may include application-specific hardware that is configured to perform employment estimation processes described herein, with or without the use of software. Once calculated, employment estimation module 73 may generate and store an employment estimate report, for subsequent retrieval. Alternatively, employment estimation module 73 may generate, output, publish, and/or distribute an employment estimate report 80 to one or more subscribers (not shown) via I/O device(s) 55.

Figure 3:
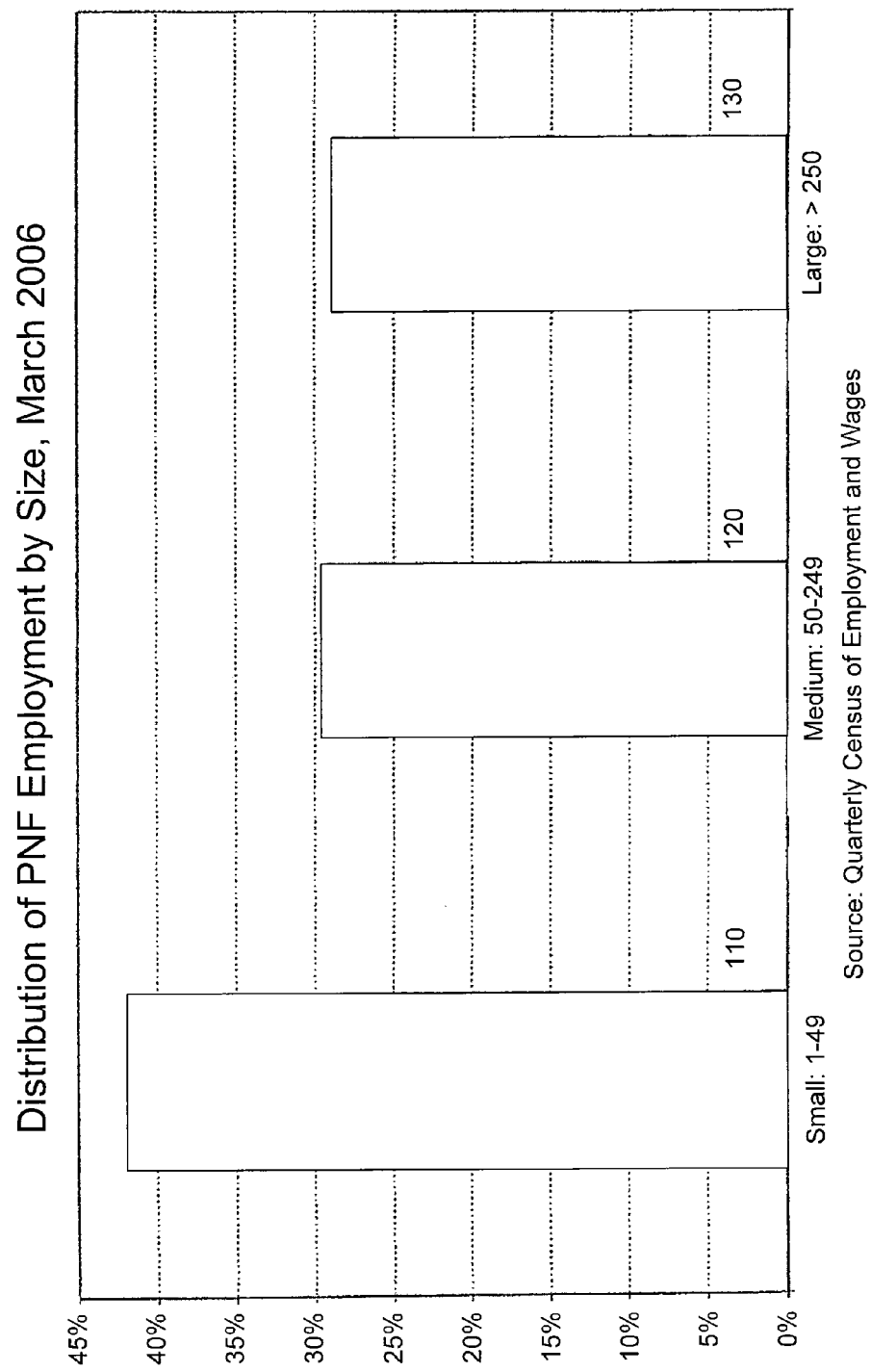
FIG. 3 shows the distribution of private non-farm employment according to establishment size as recorded by the BLS in its Quarterly Census of Employment and Wages (QCEW)

FIG. 3 shows the stratification of annual BLS QCEW data by size of employment establishment. Small firms of less than 50 employees 110, employ 40 percent of the total non-farm employees according to the BLS' QCEW across all industry categories. Medium firms of between 50 and 250 employees 120 and large firms of greater than 250 employees 130, together employ just under 30 percent of the total employees across all industries. While the BLS employment estimate is the target for prediction in one exemplary embodiment, an alternate employment estimate, such as a European Union employment estimate, may well be the target for prediction or estimation according to the present disclosure. Although BLS data is used in this example, other comparable statistical data may be used in accordance with certain aspects of the present disclosure. The periodicity of employment estimates need not be monthly in accordance with certain aspects of the disclosure, and is also exemplary.

The methods which the BLS uses to calculate its monthly estimate of national employment can be represented by the simplified equations below, Equations 1 and 2.

$$E_{i,t}^{BLS} = E_{i,0}^{QCEW'} \prod_{m=1}^{t} \left(1 + \dot{E}_{i,m}^{bls}\right) \qquad \text{Equation 1}$$

$$E_{T,t}^{BLS} = \sum_{i} E_{i,t}^{BLS} \qquad \text{Equation 2}$$

The subscript i designates a given industry, m designates a month from 0 to 11, and t designates the time in months for which the employment level estimate is desired, also ranging from 0 to 11. At time equals March, both t and m equal zero, that is there is no change in BLS estimated employment level as compared to the BLS QCEW report in March. At April, m is 1 and t is also 1. And finally, February of the following year yields at of 11 and an m of 11. The monthly estimate of employment by the BLS ($E^{BLS}$) for a given industry, i, at a time t, is the bench leveled BLS estimate based on the QCEW ($E^{QCEW'}$) a month of first quarter data times the accumulated growth rate as measured by the monthly BLS CES survey ($\dot{E}^{bls}$) over time, t. At time 0, March of a given year, the BLS monthly estimate of employment becomes the bench leveled QCEW recorded value, which is the BLS census based estimate of March for the given year. Subscript i, is specific to the industry classification, NAICS. Superscript bls identifies a value derived from BLS-CES survey data. QCEW' represents the bench leveled QCEW value. The monthly growth rate from surveys are calculated from matched samples which will be described later.

The estimate of total (T) monthly employment across all industries at time t (Equation 2) is the summation of all industry monthly estimates calculated in Equation 1 for time, t.

Data from a private source of payroll data or from another source independent of the BLS survey but not necessarily private, can be different from BLS' survey data and these differences can be identified, analyzed, and, if significant, accounted for to accurately predict the *Employment Situation*. These same data differences need to be identified to develop a method which employs regression upon BLS data to derive regression coefficients to be factored into an estimate of national employment using data separate from the BLS survey. These original-raw data differences include: timing of data collection; type of data collected; assignment of industry codes; distribution of size of establishments in the respective total data pool; any bias inherent in being a customer, from a private source of payroll data, versus being a company targeted by the BLS with a survey for the purpose of obtaining random sample data; and seasonal characteristics. Below we address the identification of each of these differences listed above, in turn. Following the identification of the differences, the method of accounting for these differences is described in conjunction with the method of estimating national employment from an independent or private source of payroll data.

Timing of Data Collected.

The BLS survey specifically asks for data during a pay period which includes the $12^{th}$ of the month. Therefore, the BLS data is fixed to the $12^{th}$ of the month regardless of the pay schedule, e.g. monthly, bimonthly, or weekly. In contrast, historical data collection from a private source of payroll data may be performed on one day in a given month, irrespective of the $12^{th}$ of the month. These snapshots may record information on the most recent payroll processed, which did not necessarily include the $12^{th}$ of the month and may not have even been a regular pay period. While the pay schedules of establishments from the private data source are likely known, the payroll data received is not likely to be fixed to the $12^{th}$ of the month. While more recent data from a private source is recorded weekly and thus data for each establishment aligned with the $12^{th}$ of the month can be selected, historical data had to be normalized to the $12^{th}$ of the month to afford accurate estimation of the *Employment Situation* and high correlation of a private source of payroll data and BLS historical data. The method of normalization to a consistent day of the month is described later in conjunction with the method of employment estimating and is shown in flowchart form in FIG. 4.

In the absence of normalizing historical data to the $12^{th}$ of the month, a sample size of approximately 125, 000 was obtained from a private source of payroll data. By normalizing the raw data records to the $12^{th}$ of the month, the useable sample size was increased almost three fold, to approximately 350,000.

Type of Data Collected.

Figure 5:
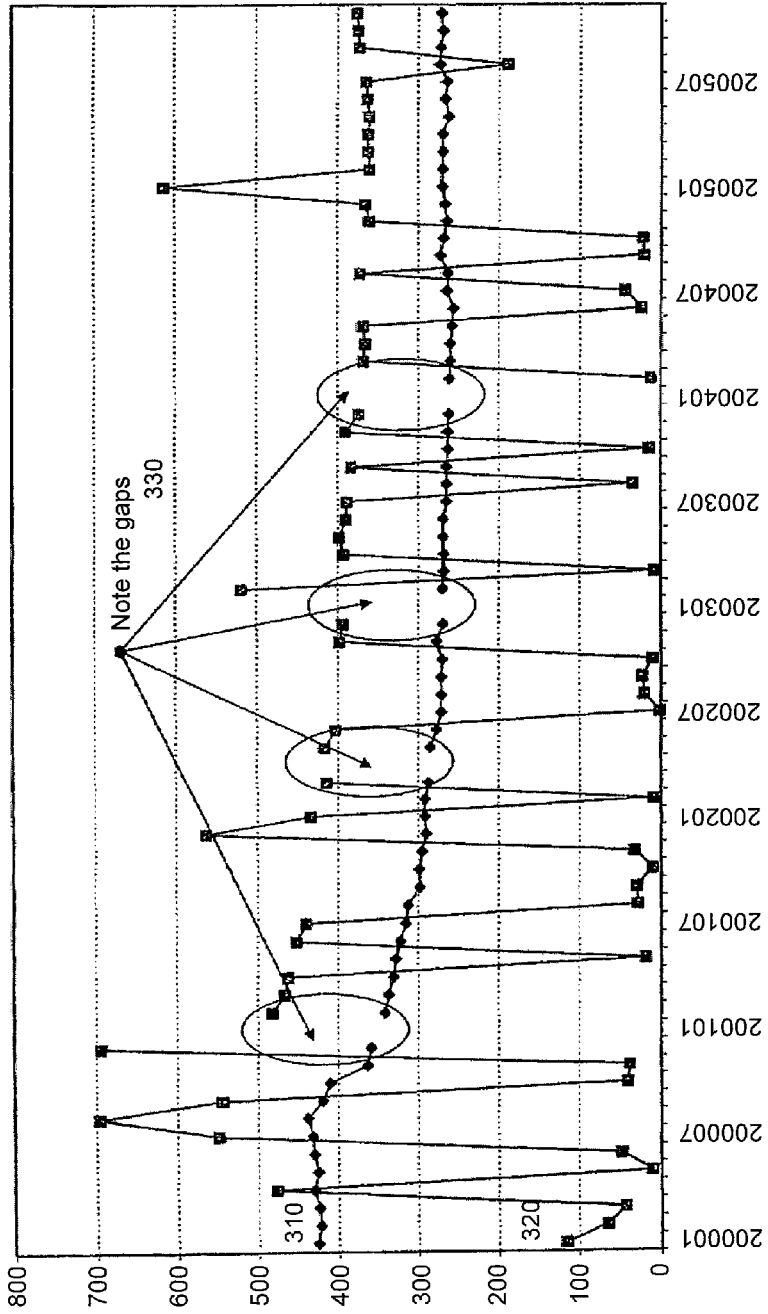
FIG. 5 shows a difference between a private source of original payroll data of active employees and the number of pays in a given pay period for a given establishment.

The BLS uses employees on the payroll or employees paid on the $12^{th}$ of the month. Original data from a private source may include both the active employees and the number of pays in a given pay period. FIG. 5 shows the difference in these types of data recorded from a given establishment of a private source of payroll data. The relatively smooth line, is the number of active employees for a given pay period. In contrast, the number of pays swings dramatically about the number of active employees, at times monthly. A data point way above the number of active employees indicates multiple payments to one person. The number of payments is so volatile that this information is not incorporated into an estimation of employment derived from a private source of payroll data. Accordingly, the number of active employees from a private source of payroll data is used as a raw data set in an exemplary embodiment.

Assignment of Industry Codes.

BLS employment estimates are industry specific. An industry assignment may not be included in the raw payroll data from a private source or from another source separate from the BLS survey. To accurately predict the BLS industry specific estimate, the private payroll data may also be classified by industry-type. As previously mentioned, BLS categorizes establishments into the NAICS codes. Matching data from a private source to the proper industry category is essential for comparison of the BLS estimate of specific industrial employment or of super NAICS industry sectors, which are a collection of industry classes. To categorize the data like the BLS data, a private data source may employ an algorithm, which references commercially available databases to assign NAICS codes to the private payroll source, data.

For example, in assigning data from a private data source to its proper NAICS category, a search may be done in databases of DUN and BRADSTREET and INFORMATION USA for the same name of the establishment and the same physical location, address. A correspondence can be accorded based on probability matching, and exact name matching, for example, could be done but is not necessary. DUN and BRADSTREET and INFORMATION USA databases combine to give the name, address, and NAICS category of over 11 million business across the U.S. The NAICS assignment for the independent data is then made in accordance with the records of DUN and BRADSTREET and INFORMATION USA. A computer method employed in the present disclosure looks to find the same business in both the private source database and in one or both of DUN and BRADSTREET and INFORMATION USA databases. If a name and address match is found, then the NAICS according to DUN and BRADSTREET and INFORMATION USA is assigned to the private source data. The method of matching can be a probability matching algorithm, not restricted to an exact match.

Figure 6:
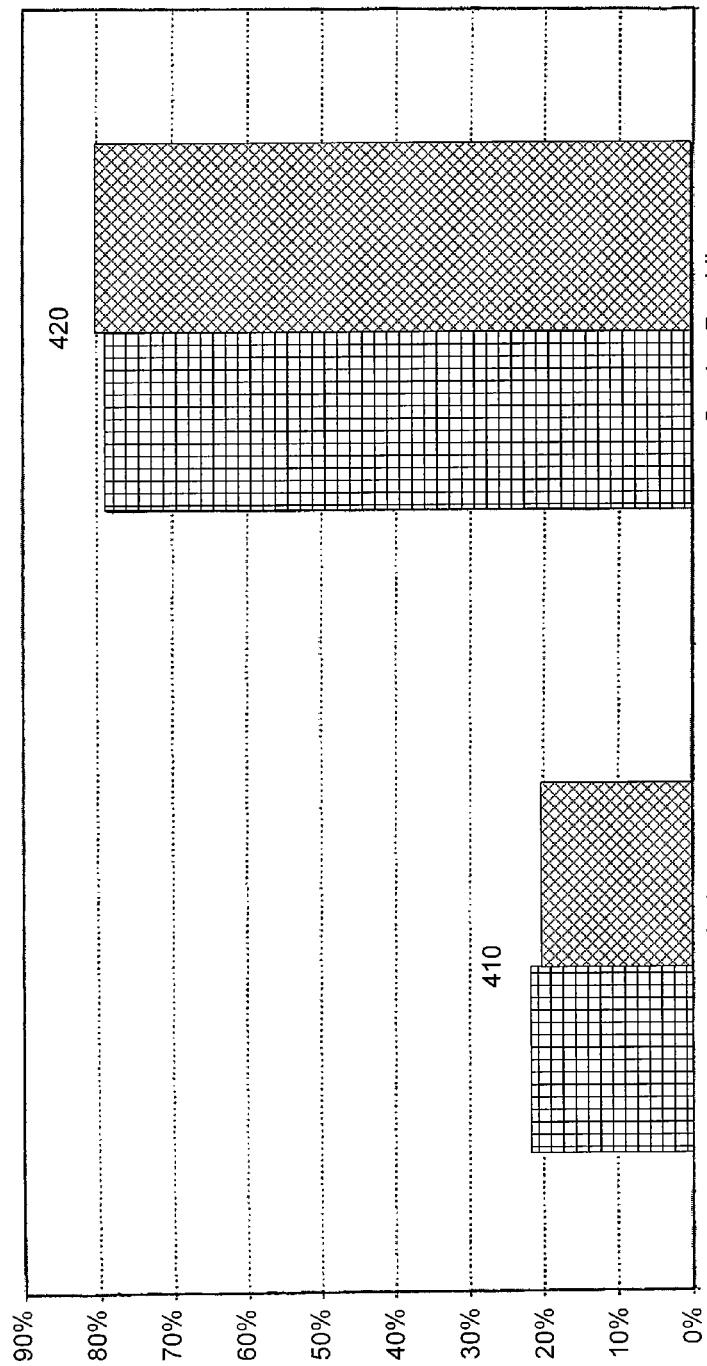
FIG. 6 is a bar graph showing the percentage of businesses from a private source which are assigned to the Goods Producing and Service Providing industries and the percentage of businesses which BLS assigns to the Goods Producing and Service Providing industries.

The bar graph of FIG. 6 shows that percentage of businesses which ADP, a private source of payroll data, assigns to the Goods Producing 410 and Service Providing industries 420 agrees well with the same industry assignments of the BLS. ADP is but one exemplary private source of payroll data. For example, although ADP is discussed in connection with certain embodiments disclosed herein, the processes and methods described herein may be compatible with any private source of payroll data. For convenience, payroll data gathered by one or more payroll processing services may embody the most readily-available form of private source payroll data. Such payroll data may include, for example, payroll data gathered by one or more of the following payroll service providers: Paycor, Paychex, Inc., Paylocity Corporation, Ciridian, Netchex, Intuit Inc., CompuPay, Inc., or any other suitable company that processes payrolls for private companies.

Furthermore, it is also contemplated that a combination of private sources of payroll data may be used in conjunction with the processes and methods described herein. For example, certain payroll data associated with larger private payroll service providers may not include an appropriate number of small business payroll records to sufficiently account for a statistically reliable number of small businesses. As such, payroll data collected by a company that provides payroll service for a statistically appropriate number of large businesses, but which lacks data for a statistically reliable number of small businesses may be supplemented with data associated with a payroll service provider that processes payroll data for a larger, more statistically meaningful number of small businesses. It is contemplated that such a process of combining different sources of payroll data may be coupled with the regression techniques described herein to ensure that any bias with respect to industry, company size, payroll processing date, etc. may be appropriately accounted for and mitigated.

The industry assignment process according to the present disclosure is not limited to this exemplary embodiment employing the databases of DUN and BRADSTREET and INFORMATION USA. Alternate databases may be used for industry assignments of U.S. companies and alternate databases can readily be used for foreign establishments, such as DUN and BRADSTREET EASTERN EUROPE.

Distribution of Size of Establishments in Respective Total Data Pools.

Figure 7:
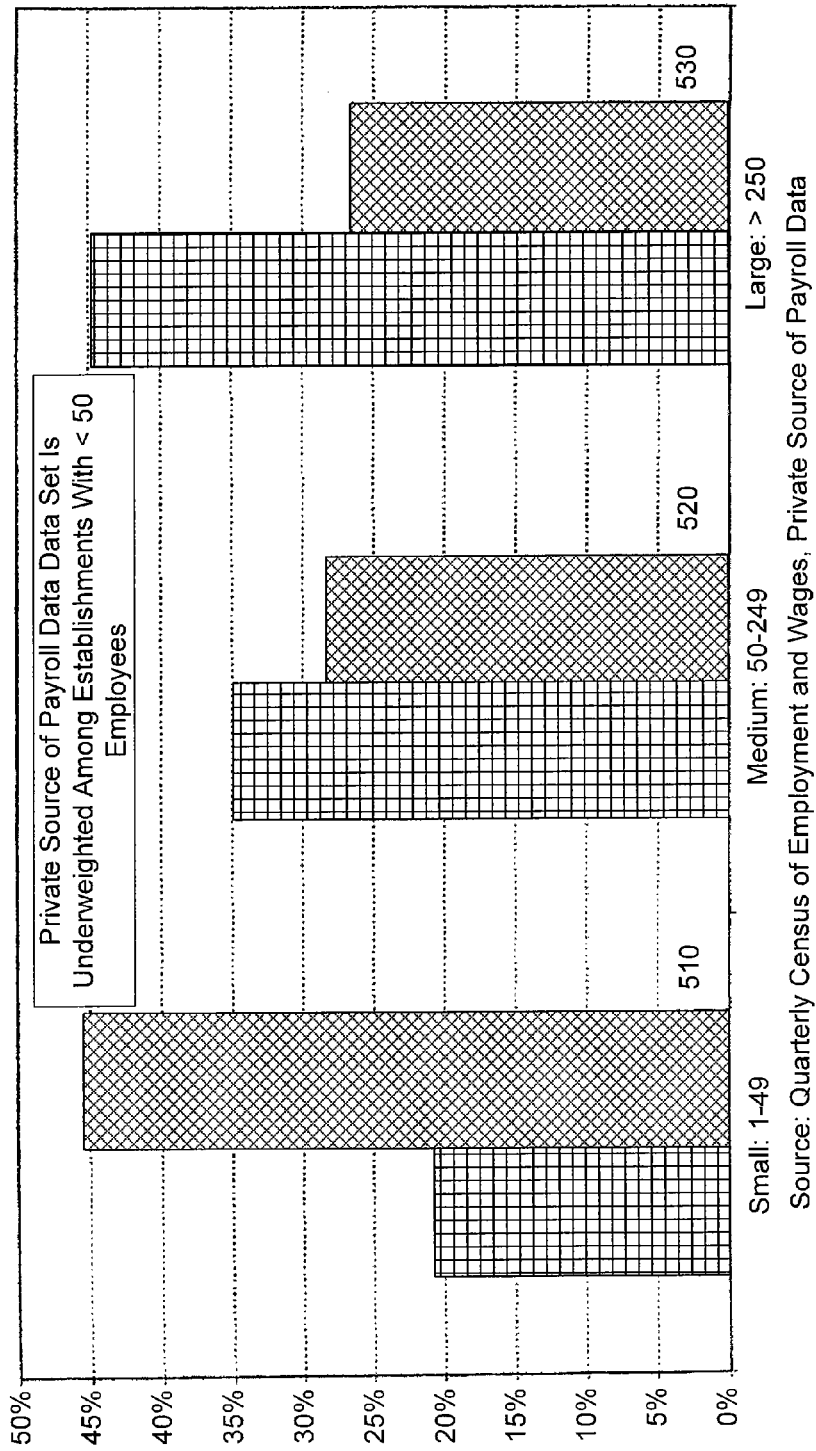
FIG. 7 shows the relative distributions of BLS and a private source of payroll data according to business size.

In addition to correlation of industry classifications between a private source of payroll data and the BLS, the size of business distribution between a private source of payroll data and actual U.S. businesses can contribute to estimate disparity. FIG. 7 shows a comparison of the size distribution of an exemplary private source of payroll data, data and that of the BLS' QCEW. Since the BLS' QCEW data is a near census, it more accurately reflects U.S. businesses at large. FIG. 7 shows the relative distributions of BLS-QCEW and private data according to business size: small, less than 50 employees 510; medium, between 50 and 250 employees 520; and large, greater than 250 employees 530. The private data source shown in FIG. 7 processes a disproportionate number of large company payrolls, nearly double the actual percentage of U.S. businesses. And the size distribution of the private data source indicates that the percentage of small companies which use the private data source services is only about half the actual distribution of small businesses in the U.S. Accounting for this difference will be described later with reference to Equation 4. The size distribution of FIG. 7 is an exemplary distribution and any size distribution different from census data can be accounted for in accordance with the present disclosure.

Private Source of Payroll Data Versus Random Sample Data.

Figure 8:
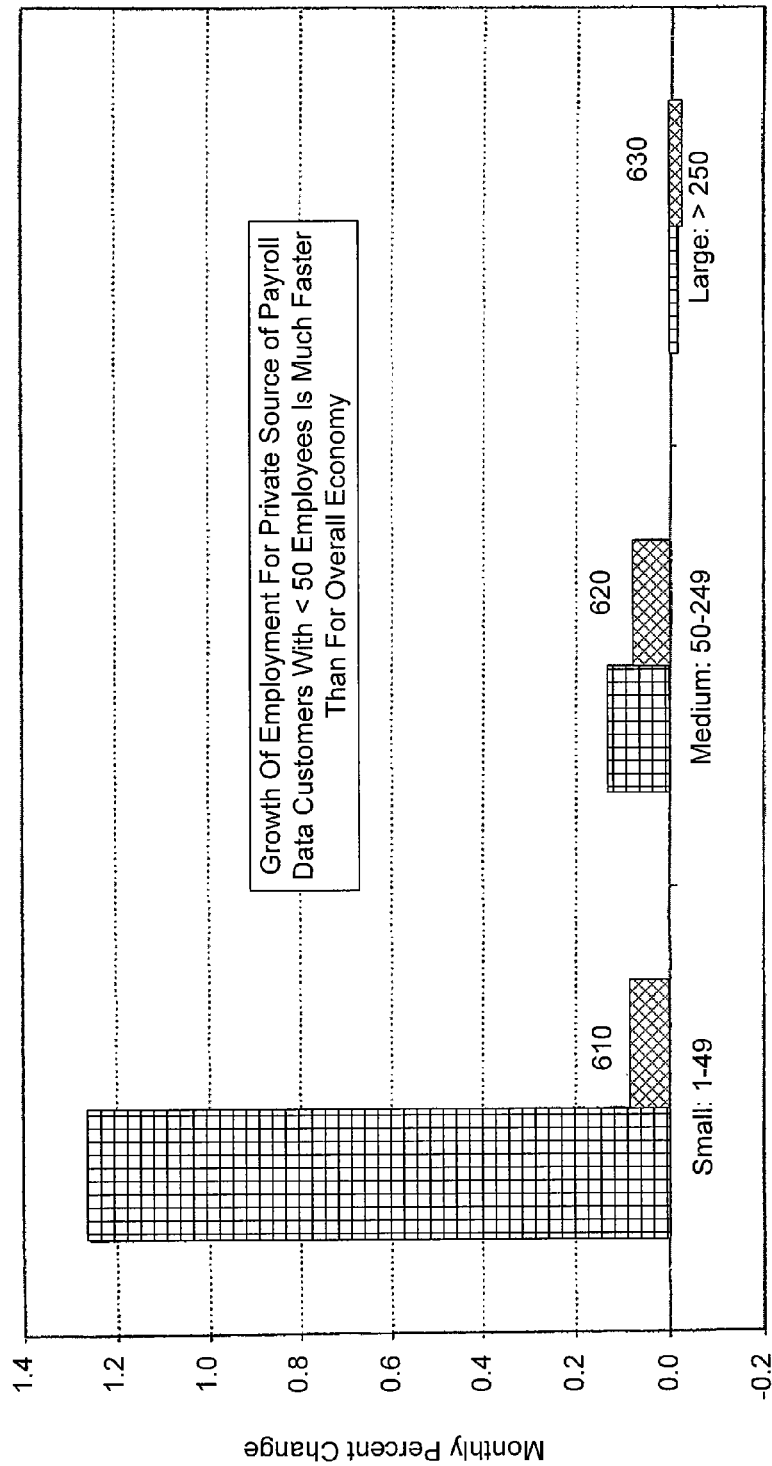
FIG. 8 shows the monthly percent change of employment in a firm from a private source of payroll data in contrast to the national growth, the BLS' QCEW, for small, medium and large firms.

In addition to a difference in business size distribution from a private source of payroll data and actual nation-wide size distribution, performance bias between private source customers and industries at large is also possible. Is the performance, or employee growth rate of small, medium and large firms from a private source comparable to growth measured by the BLS as reflected in the QCEW? FIG. 8 shows the monthly percent change in an exemplary source of private payroll data in contrast to the data of the BLS' QCEW over a six year period. In this example, small firms overall increased at a rate of less than 0.1 percent per month, while small firms associated with the exemplary private source of payroll data experienced a growth rate of 1.2 percent per month over the same six years. The exemplary private source of payroll data experienced more employee growth in medium firms as well, compared to actual medium sized firms. In large firms, the exemplary private source of payroll data experienced slightly less of a reduction of employees relative to large firms overall. Difference in performance, as well as size distribution, will be addressed below with reference to Equation 4.

Seasonal Characteristics.

Figure 9:
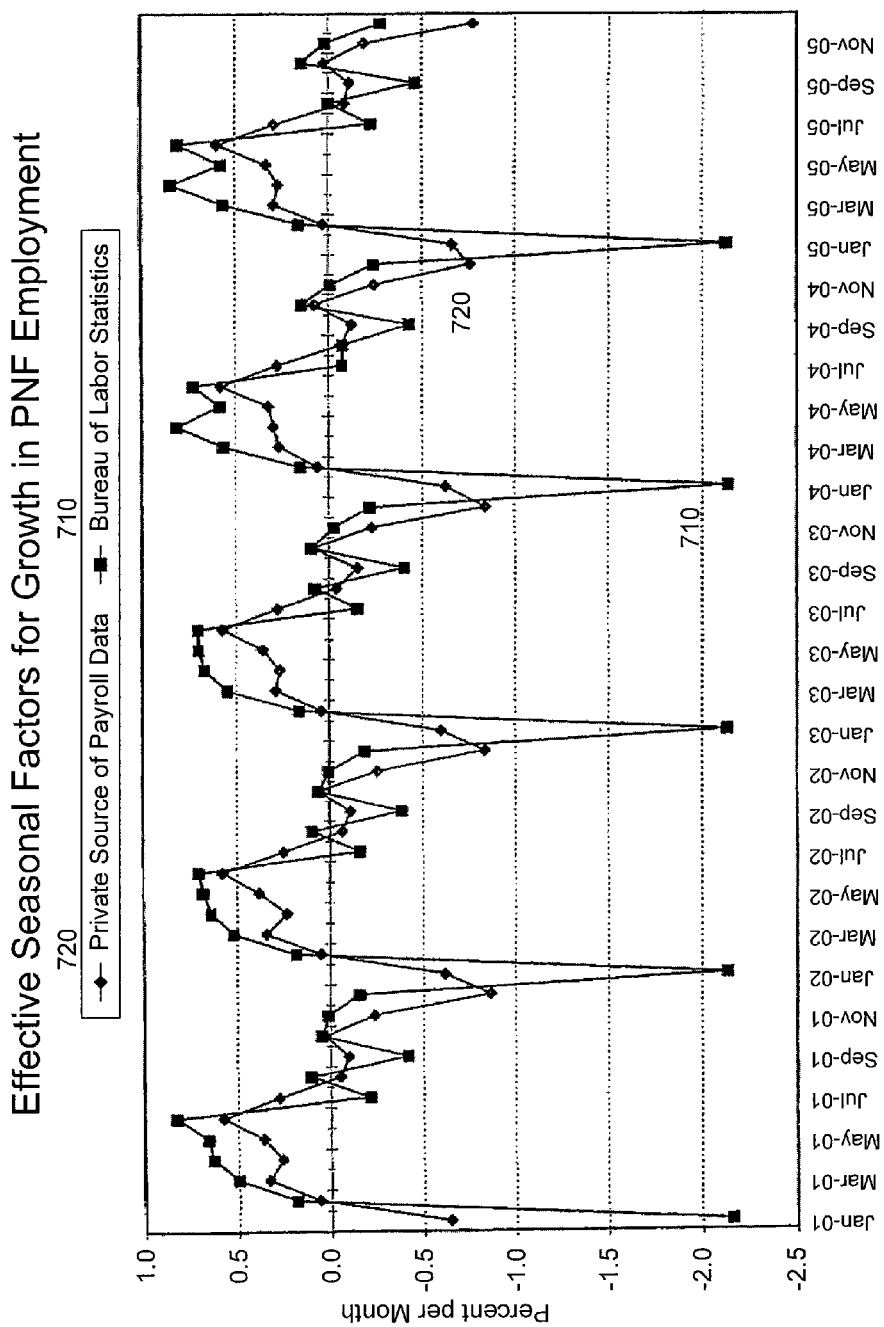
FIG. 9 is graph of BLS and a private source of payroll data over 6 years time showing the difference in seasonality between the two data sets.

A seasonal model describes a time series that changes in a regular way with a given cycle. When the cycle is a year, the variation might describe the annual seasons, fall, winter, spring and summer. The cycle can be any time interval, such as the seven days of the week or the four weeks of a month. An accurate estimate may compensate for appreciable seasonality. Since the BLS data and a private source of payroll data that is also industry stratified employment data are similar, one of ordinary skill may expect parallel seasonality between the two. However, a difference in seasonality may also be present. The BLS data spikes downward every January 710 when the retail establishments let their holiday work force go as shown in FIG. 9. In contrast, a private source of payroll data may yield a lowest employment value in December. Such an exemplary difference in seasonality is shown graphically in FIG. 9. The data shown is raw data, with no seasonal adjustments applied. The low employment value in December from a private source of payroll data 720 may be due to accounting corrections, for example, performed at a majority of establishments when employees that were previously let go are actually taken off the payroll.

General Data Collection.

Timeliness and accuracy of payroll data must be controlled for in forming a database from a private source of payroll data for employment estimating. Processing of payrolls may take place all around the country, for example at regional or state processing centers. Regional or state data may be summed into one large database. Data may be audited for large changes before it is compiled into the database for subsequent estimations. Large changes, for example, in data from a particular center may be investigated, and data from a center may not be incorporated into the database unless it is verified.

BLS data is predominately establishment data, location derived, whether referring to QCEW mandatory reporting data or survey data. A private source of data may originate from payrolls or businesses, and not from individual establishments of a given business. In fact, there may be no way to determine if a payroll or business has more than one establishment from a private payroll data source. The exemplary private source of payroll data includes payroll data and not establishment employee data. Therefore, employment estimates derived from the exemplary private sources of payroll data are employee payroll estimates not an employee establishment estimates. Since approximately 90% of businesses have one payroll and one establishment, that is they operate out of a single location there is a strong correlation between payrolls and establishments.

In one exemplary embodiment a private source of payroll data, ADP payroll data, used in formulating national private non-farm employment estimates during the last six months of 2006 averaged approximately 364,000, covering roughly 22 million employees in all major private industries and regions.

Accounting for Differences in Original Data and Method of Employment Estimating.

Figure 4:
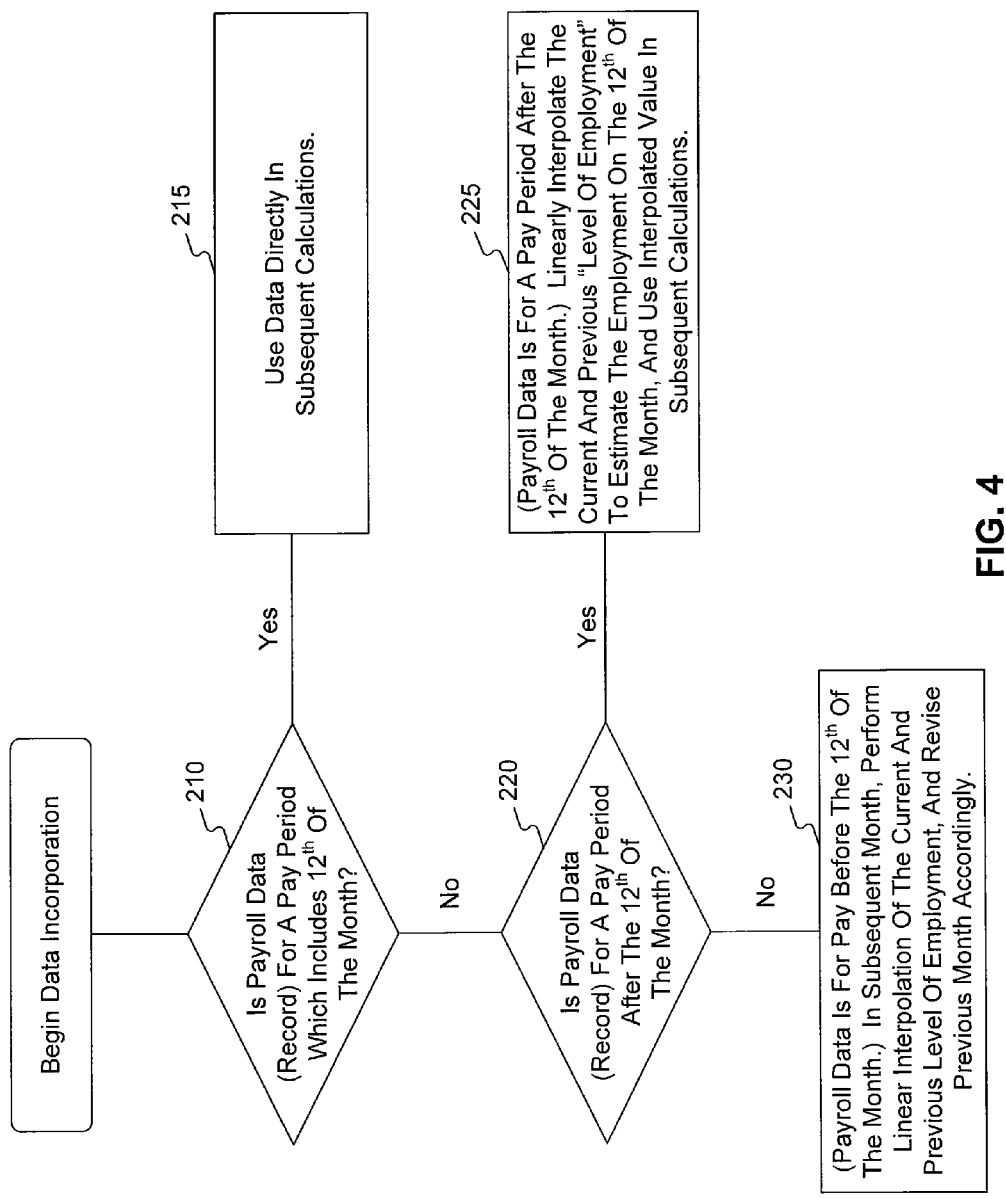
FIG. 4 is a flow diagram illustrating a method used to normalize historical data from a private source to that of the BLS, which is fixed to the 12th of the month.

A private source of original payroll data is normalized to the $12^{th}$ of the month. The normalization process is illustrated by the flowchart of FIG. 4. If employment on a private payroll record is for a pay period that includes the 12$^{th}$ of the month 210, that record is used directly in subsequent calculations 215. If employment on a private payroll record is for a pay period after the 12$^{th}$ of the month 220, an estimate of employment on the 12$^{th}$ of the month is computed as a linear interpolation of the current and previous level of employment shown on that record, and then used in subsequent calculations 225. If employment on a private record is for a pay period before the 12$^{th}$ of the month, an estimate of employment on the 12$^{th}$ of the month is computed as a linear interpolation of the current and following level of employment shown on that record, and then used in subsequent (next month's) calculations 230. This forward interpolation cannot be performed in the current month, and so is the basis for revisions the following month. In the current month, in which the data sample is for a pay period before the 12$^{th}$ of the month, that sample record drops out of the matched sample growth rate data.

One exemplary estimate of employment growth, published in the ADP National Employment Report, is computed in accordance with the methods described below. The ADP data represents but one exemplary source of private payroll data, and the methods below apply to any source of payroll data. The BLS employment estimate and an estimate in accordance with an exemplary embodiment of the present disclosure both employ a matched sample growth rate. A matched sample growth rate is based on payrolls common to both periods over which growth is computed.

The concept of matched sample growth rate is described with reference to FIG. 5. Referring to FIG. 5, both the number of active employee data 310 and the number of pays 320 display gaps 330 in the data. This particular record would drop out of the database used to calculate a private non-farm employment estimate, at the gap 330, where no active employees are recorded for two consecutive months. And only when two consecutive months of data are present is the data reincorporated into the latest estimation of the monthly employment. If a new business begins to use a private payroll processor for payroll purposes in April, the employee data for that business will not be included in the matched sample growth rate until its payroll data is received by the private payroll processor for two consecutive months. This method essentially measures changes in employment at an establishment in a given industry as opposed to changes in number of private payroll source clients. Since only data that is matched, or present for two consecutive months, is incorporated into the data set from which the employment estimate are made, aberrations of large increases or decreases due to changes in client base and not industry growth are controlled. Similar matching is done by the BLS. While changes in client base are not present to misrepresent an industry specific growth, mergers would yield a similar aberration, where two payrolls are essentially combined into one.

The data from a private data source is filtered for outliers. Private data, which has NAICS codes assigned, is stratified into 90 cells. Monthly matched sample growth rates of employment are computed in 90 cells. Each cell represents one of nine class sizes within one of 10 industry super sectors, defined by NAICS codes. Estimates of trend cycle and seasonal index are made using X-12-ARIMA (auto-regressive integrated moving average) seasonal adjustment software developed by the U.S. Bureau of the Census in 1996. BLS uses the same seasonal adjustment program, however, as previously discussed, BLS data has a different seasonal index. Both the seasonal factors and the centered moving averages on which the seasonal factors are based are estimated excluding the effect of estimated outliers in each cell. The sample period for estimation of the seasonal factors and the centered moving average trend is advanced each month.

For each record from a private payroll data source a growth residual is calculated by subtracting from the growth rate of employment on that record both the seasonal factor and the centered moving average trend estimated for that cell.

These growth residuals are grouped into 9 classes by size of payroll and, in each size class, each month, are ranked in descending absolute value. For each size class, each month, the payroll records (j) with the largest percent of growth residuals (in absolute value) are discarded as cross-sectional outliers, and the matched sample growth rates are recomputed in each of the 90 cells cell from the remaining records. This net growth calculation is shown below in Equation 3, as:

$$\dot{e}_{i,s,j,t} = \dot{E}_{i,s,j,t} - SF_{i,s,t} - TC_{i,s,t} \qquad \text{Equation 3}$$

The subscripts above are defined as i, industry; t, month; s, size; and j, control, the specific matched sample record. The left hand side of the equation (e) is net growth. The first term on the right hand side of the equation is the non-seasonally adjusted growth rate of employment in month t. The second term, on the right hand side is the seasonal factor for the subject cell, defined by i and s, at time t. And finally, the last term is the corresponding trend cycle component for the same cell. As shown by Equation 3, the net growth is equal to the non-seasonally adjusted growth of employment in month t, of size s, in industry i minus both the seasonal factor for that cell and the trend cycle component for that cell. Outliers in each size class (1-9) are discarded and defined as having an absolute value greater than a specific percentile of all net growth absolute values, which could be the top 0.10 percent.

The new matched sample growth rates are seasonally adjusted using X-12 ARIMA, with estimated outliers in each cell replaced with the predicted value from the underlying ARIMA model; the occurrence of estimated outliers is rare. The sample period for the estimation of the seasonal factors (and the centered moving average) is advanced each month.

An additional adjustment is evaluated for 5 week intervals between BLS survey dates. This evaluation is made by regressing the matched sample growth rates in each cell on a constant term and a dummy variable that has a value of one in long months and zero otherwise. If the result is statistically significant and positive then the matched sample growth rate in that cell is recalculated, reduced by the effect of long month. In one month, t, for example, significant "long-month" effects were found in approximately 25 percent of the 90 cells. Note that the adjustment for long months is not applied uniformly across all cells at a time t.

Using the seasonally adjusted data, matched sample growth rates by industry are computed by taking a weighted average of the matched sample growth rates by size within each industry (super sector).

The weights are based on monthly interpolations of the March estimates of employment by industry and size from the Quarterly Census of Employment and Wages (QCEW). This weighting is necessary for two reasons. First, because the BLS monthly CES data and subsequent Employment Situation report are not stratified by size. Only the March QCEW data is divided into size categories. Using the March QCEW data, a set of relative size weights within each of the ten NAICS super sectors is computed. These weights are then linearly interpolated to the monthly frequency, without seasonal adjustment. These weights are represented as w, in Equation 4, below. Second, these weights are used to account for differences in establishment size distribution between BLS and data from a private data source 510, 520, 530, as shown for example, in FIG. 7.

The current BLS estimates for employment growth, be they initial, revised, or adjusted in accordance with the QCEW data of March, by (super sector) industry, i, are regressed on: (a) the matched sample growth rates by industry (super sector) based on the private source data; (b) a weighted average of the historical average growth rates of employment in each cell based on QCEW data; (c) a weighted average of the historical average growth rates of employment based on the matched sample growth rate (MGSR) of private source data; (d) the values for each of the previous j months, j=1 though n, of the difference between BLS estimates for employment growth in every industry (super sectors), i=1 through 10, and the corresponding historical averages of these estimates; (e) initial unemployment claims filed during the week before the week that includes the 12$^{th}$ day of the month. This regression is represented by Equation 4, below, and provides the coefficient for industry i($\beta_i$,). The coefficient on term (b) is restricted to unity. The coefficient on term (c) is restricted to the negative of the coefficient on term (a). Term (b) is the product of w and b. Term (c) is the product of w and a. Term (a) is the product of w and the MSGR as calculated from a private source data. Term (d) includes the values for each of the previous j months, j=1 though n, of the difference between BLS estimates for employment growth in every industry (super sectors), i=1 through 10, and the corresponding historical averages of these estimates. Term (e) is initial unemployment claims filed during the week before the week that includes the 12$^{th}$ day of the month.

This regression method allows for different trends, b and a, of employment in BLS and private source data, respectively. Variables b and a are the average employment growth rate for the cell corresponding to the given i and s. These averages compensate for the difference in performance, or trends, in, for example, small firms as compared to small firms at large 610. This performance difference is shown in the example of FIG. 8. The performance difference of FIG. 8 is exemplary only and performance differences between industries at large and private source data are well compensated in accordance with the present disclosure. At the same time, the regression allows for an industry-wide relationship between monthly variations in private source data and monthly variations in the BLS data holding for all size classes within that industry. The regression also allows for an industry-wide relationship between monthly variations in private source data and monthly variations in: (a) BLS data in every industry (super sector) in each of the previous j months; (b) initial unemployment claims filed during the week before the week that includes the 12$^{th}$ day of the month. This regression is shown in Equation 4, as:

$$E_{i,t}^{bls} - \sum_{s=1}^{9} w_{i,s,t-1} b_{i,s} = \beta_i \sum_{s=1}^{9} w_{i,s,t-1}\left(MSGR_{i,s,t}^{pds} - a_{i,s}\right) + \quad \text{Equation 4}$$

-continued $$\sum_{i=1}^{10} \sum_{j=1}^{n} \delta_{i,j}\left(E_{i,t-j}^{bls} - c_{i,j}\right) + \gamma_i(IUC_t - d)$$

Reading Equation 4 from left to right, we have the growth rate of employment as reported by the BLS (based on survey data) in the *Employment Situation* for industry, i, at time, t, less the summation of products of weighted QCEW growth rate by cell, weighted to reflect the difference in growth rates between companies at large of a particular size and private processor serviced companies, times the sample average growth rate of the QCEW data by cell. Although the growth rate of employment as reported by the BLS (based on survey data) is used in this example, other comparable growth rates and corresponding average may be used in accordance with certain aspects of the present disclosure.

A predicted private source growth in each cell is derived by integrated regression, as shown in Equation 5. The variables are defined in relation to Equation 4, above.

A level of employment is established in each cell by cumulating the predicted value of the matched sample growth rate in each cell forward and backwards from the most recently benchmarked March estimate of employment in that cell, as represented by Equation 6. Such referencing effectively weights the growth rates of the private source data in each cell by the observed distribution of employment by industry and size classification.

These levels can then be summed to the aggregates by select industry and size of payroll, examples of which are shown in Table 1 and described by Equation 7 below. The variables, subscripts, and superscripts are as defined above.

$$E_{i,s,t}^{pds} = b_{i,s} + \beta_i\left(MSGR_{i,s,t}^{pds} - a_{i,s}\right) + \quad \text{Equation 5}$$

$$\sum_{i=1}^{10} \sum_{j=1}^{n} \delta_{i,j}\left(E_{i,t-j}^{bls} - c_{i,j}\right) + \gamma_i(IUC_t - d)$$

where, $$\dot{E}_{i,s,t}^{pds} = b_{i,s} + \beta_i\left(MSGR_{i,s,t}^{pds} - a_{i,s}\right)$$

$$E_{i,s,t}^{pds} = w_{i,s,0} E_{i,0}^{bls} \prod_{m=-j}^{t} \left(1 + \dot{E}_{i,s,t}^{pds}\right)^{m-0} \quad \text{Equation 6}$$

$$E_t^{pds} = \sum_{i=1}^{10} \sum_{s=1}^{9} E_{i,s,t}^{pds} \quad \text{Equation 7}$$

TABLE 1.

| Employees on nonfarm private payrolls by selected industry sector and size (In thousands) | | | | | | | |
|---|---|---|---|---|---|---|---|
| | Seasonally Adjusted | | | | | | |
| Industry/Size of Payroll | Sep. 2006 | Oct. 2006 | Nov. 2006 | Dec. 2006 | Jan. 2007 | Feb. 2007 | Change from: Jan. 2007- Feb. 2007p |
| Total nonfarm private | 114,432 | 114,557 | 114,815 | 114,933 | 115,054 | 115,111 | 57 |
| Small (1-49) | 50,040 | 50,106 | 50,203 | 50,299 | 50,373 | 50,426 | 53 |
| Medium (50-499) | 45,000 | 45,053 | 45,166 | 45,191 | 45,243 | 45,276 | 33 |
| Large (>499) | 19,392 | 19,398 | 19,446 | 19,443 | 19,438 | 19,409 | −29 |
| Goods-producing | 22,492 | 22,473 | 22,491 | 22,473 | 22,457 | 22,414 | −43 |
| Small (1-49) | 8,085 | 8,087 | 8,102 | 8,115 | 8,121 | 8,118 | −3 |
| Medium (50-499) | 9,941 | 9,933 | 9,943 | 9,926 | 9,917 | 9,900 | −17 |
| Large (>499) | 4,466 | 4,453 | 4,446 | 4,432 | 4,419 | 4,396 | −23 |
| Service-producing | 91,940 | 92,084 | 92,324 | 92,460 | 92,597 | 92,697 | 100 |
| Small (1-49) | 41,955 | 42,019 | 42,101 | 42,184 | 42,252 | 42,308 | 56 |
| Medium (50-499) | 35,059 | 35,120 | 35,223 | 35,265 | 35,326 | 35,376 | 50 |
| Large (>499) | 14,926 | 14,945 | 15,000 | 15,011 | 15,019 | 15,013 | −6 |
| Addendum: | | | | | | | |
| Manufacturing | 14,133 | 14,118 | 14,117 | 14,095 | 14,072 | 14,043 | −29 | p = preliminary

Table 1 is an exemplary summary table of the monthly National Employment Report, produced using ADP as the source of private payroll data. The data summarized in table 1 does not rely on BLS survey data and is estimated before the BLS publishes its monthly report estimating changes in monthly employment. As seen from the table above, service providing employment is estimated to rise while, goods producing employment is predicted to decline overall. The monthly estimations tabulated above are also shown graphically in FIG. 10.

Figure 10:
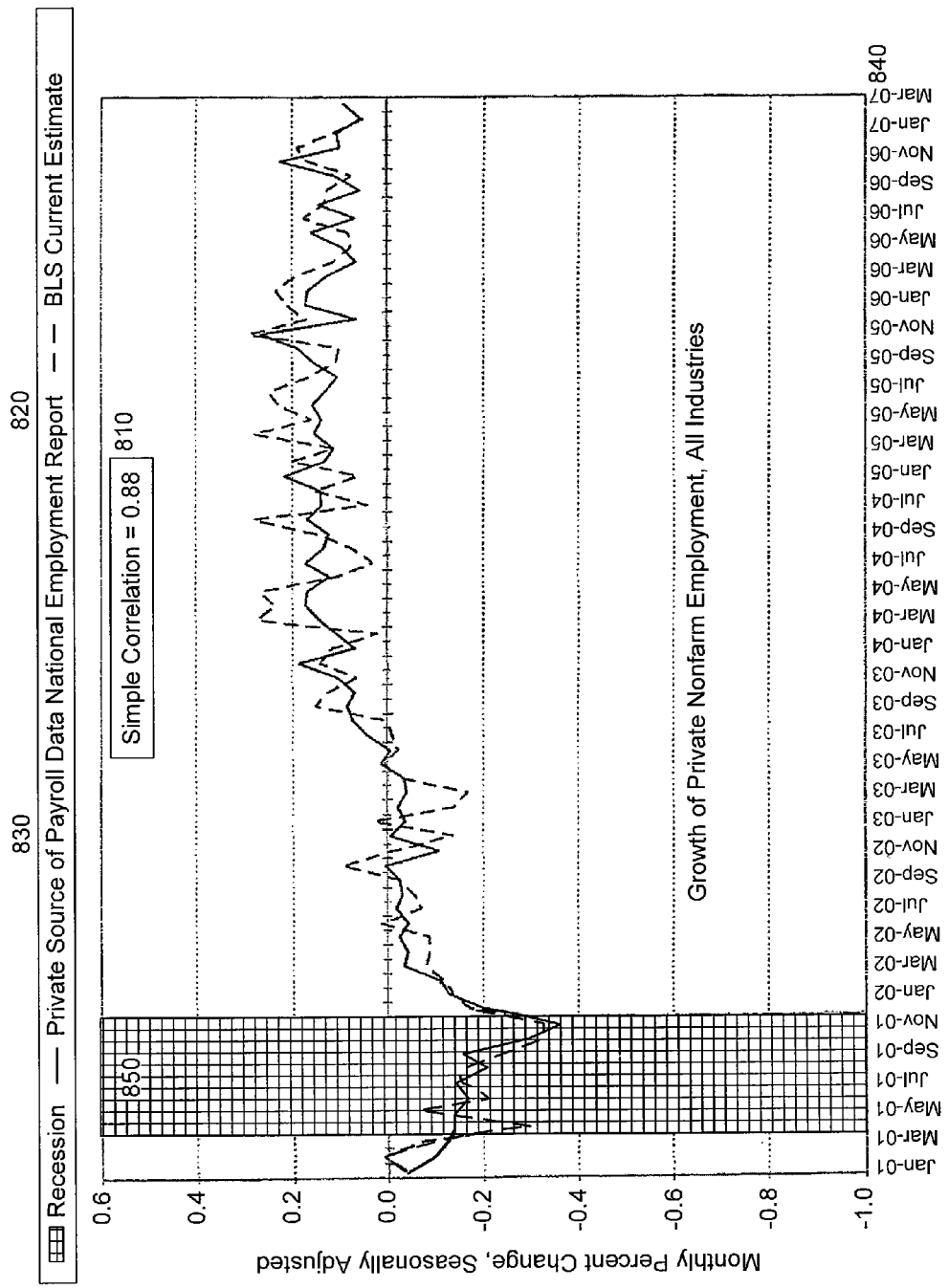
FIG. 10 shows the correlation of a total industry estimated employment growth from a private source of payroll data in relation to a BLS monthly report.

FIG. 10 shows the 0.88 correlation 810 of ADP employment estimates to actual BLS monthly estimates 820, where ADP data was the private source of payroll data 830, and the method of employment estimation was in accordance with the present disclosure. The period of regression shown in FIG. 10 spans six years and three months time 840, which includes a brief recessionary period 850.

The method of employment estimating consistent with the present disclosure can be used in real time to improve upon consensus forecasts of the monthly change in establishment employment. Empirical analysis shows that when using ADP as the source of private payroll data, the current method yields a goodness of fit to the BLS estimate of percent change in non-farm private employment of 0.767. In contrast, the BLOOMBERG CONSENSUS yields a goodness of fit upon the BLS monthly employment estimate of 0.603.

While the present disclosure has been described in relation to the BLS estimate of national monthly employment, one of ordinary skill recognizes that a private data source can be used to predict the employment forecast of other sources using the methods and systems described herein. A European Union sponsored employment forecast could, for example, be predicted using a private payroll data source using the methods according to the present disclosure. The desired predictive index, or employment estimate, may not be regionally bound, but rather may be bound by industry type, tourism, for example.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A processor-implemented method of an estimating employment level comprising:
   receiving at a processor, a first set of payroll data that includes at least one payroll record associated with at least one entity;
   determining, at the processor, a format associated with the at least one payroll record of the first plurality of payroll data;
   normalizing, at the processor, the format associated with the at least one payroll record of the first plurality of payroll data to conform to a format associated with a second set of payroll data;
   calculating, at the processor, a regression coefficient associated with the normalized first set of payroll data, wherein the regression coefficient comprises a value indicative of a difference in growth rates between the first set of payroll data and the second set of payroll data, and is based, at least in part, on a number of unemployment claims filed during a predetermined period associated with the first set of payroll data; and
   estimating, at the processor, an employment level based on the first set of normalized payroll data and the regression coefficient.

2. The processor-implemented method of claim 1, wherein the first set of payroll data comprises a private source of payroll data compiled by a payroll service provider.

3. The processor-implemented method of claim 1, wherein the second set of payroll data comprises payroll data compiled by a census-based payroll study.

4. The processor-implemented method of claim 3, wherein the second set of payroll data comprises payroll data compiled by the Bureau of Labor and Statistics.

5. The processor-implemented method of claim 1, wherein normalizing the format associated with the at least one payroll record of the first plurality of payroll data comprises:
   selecting, at the processor, a day of a first period; and
   determining, at the processor, whether the at least one payroll record includes the selected day of the first period, if the at least one payroll record includes the selected day of the first period:
  use the at least one payroll record in estimating the employment level for the first period;
if the at least one payroll record does not include the selected day of the first period and is for a period after the selected day of the first period:
  interpolate payroll data associated with the at least one payroll record and payroll data associated with a previous period payroll record to estimate payroll data corresponding to the selected day of the first period; and
  use the interpolated data record in determining the employment level associated with the first period; and
if the employment data record does not include the selected day of the first period and is for time before the selected day of the first period:
  interpolate, in a second period following the first period, payroll data associated with the second period and payroll data associated with the at least one payroll record;
  revise the at least one payroll record in accordance with the interpolation; and
  use the revised at least one payroll record in determining the employment level for the second period.

6. The processor-implemented method of claim 1, wherein normalizing the format associated with the at least one payroll record of the first plurality of payroll data comprises assigning an industry code associated to the at least one payroll record based on the at least one entity corresponding to the at least one payroll record.

7. The processor-implemented method of claim 6, wherein assigning an industry code to the at least one payroll record based on the at least one entity corresponding to the at least one payroll record includes:
  searching at least one database that collects business information for a plurality of entities;
  matching information associated with the at least one entity with information associated with an entity stored in the at least one database; and
  assigning the industry code associated with the at least one payroll record as an industry code associated with the matched entity stored in the at least one database.

8. The processor-implemented method of claim 7, wherein the at least one database includes NAICS codes and associated company information.

9. The processor-implemented method of claim 6, wherein the industry code is selected from among one of the codes established by the North American Industry Classification System (NAICS).

10. The processor-implemented method of claim 1, wherein calculating the regression coefficient comprises:
  determining at least one matched sample growth rate associated with the normalized first set of payroll data;
  determining a weighted average of historical growth rates of employment based on Quarterly Census of Employment and Wages (QCEW) compiled by the Bureau of Labor and Statistics; and
  determining a weighted average of historical growth rates of employment based on the at least one matches sample growth rate associated with the normalized first set of payroll data;
  determining a difference between a BLS employment growth estimate and a corresponding historical average of employment growth rate for each of a predetermined number of previous months; and
  determining initial unemployment claims filed during a portion of a time period associated with the first set of payroll data.

11. A calculator for estimating employment level, comprising:
  a storage device configured to store a first set of payroll data, the first set of payroll data including at least one payroll record associated with at least one entity;
  a processor communicatively coupled to the storage device and configured to:
    normalize a format associated with the at least one payroll record of the first plurality of payroll data to conform to a format associated with a second set of payroll data;
    calculate a regression coefficient associated with the normalized first set of payroll data, wherein the regression coefficient comprises a value indicative of a difference in growth rates between the first set of payroll data and the second set of payroll data, and is based, at least in part, on a number of unemployment claims filed during a predetermined period associated with the first set of payroll data;
    estimate an employment level based on the first set of normalized payroll data and the regression coefficient; and
    store the estimated employment level in the storage device for subsequent retrieval.

12. The employment level calculator of claim 11, wherein the processor is further configured to provide the estimated employment level to one or more subscribers.

13. The employment level calculator of claim 11, wherein the processor is further configured to output the estimated employment level on a display device.

14. The employment level calculator of claim 11, wherein the first set of payroll data comprises a private source of payroll data compiled by a payroll service provider.

15. The employment level calculator of claim 11, wherein the second set of payroll data comprises payroll data compiled by a census-based payroll study.

16. The employment level calculator of claim 15, wherein the second set of payroll data comprises payroll data compiled by the Bureau of Labor and Statistics.

17. The employment level calculator of claim 11, wherein normalizing the format associated with the at least one payroll record of the first plurality of payroll data comprises:
  selecting, at the processor, a day of a first period; and
  determining, at the processor, whether the at least one payroll record includes the selected day of the first period,
  if the at least one payroll record includes the selected day of the first period:
    use the at least one payroll record in estimating the employment level for the first period;
  if the at least one payroll record does not include the selected day of the first period and is for a period after the selected day of the first period:
    interpolate payroll data associated with the at least one payroll record and payroll data associated with a previous period payroll record to estimate payroll data corresponding to the selected day of the first period; and
    use the interpolated data record in determining the employment level associated with the first period; and
  if the employment data record does not include the selected day of the first period and is for time before the selected day of the first period:

interpolate, in a second period following the first period, payroll data associated with the second period and payroll data associated with the at least one payroll record;

revise the at least one payroll record in accordance with the interpolation; and use the revised at least one payroll record in determining the employment level for the second period.

18. The employment level calculator of claim 11, wherein normalizing the format associated with the at least one payroll record of the first plurality of payroll data comprises assigning an industry code associated to the at least one payroll record based on the at least one entity corresponding to the at least one payroll record.

19. The employment level calculator of claim 18, wherein assigning an industry code to the at least one payroll record based on the at least one entity corresponding to the at least one payroll record includes:

searching at least one database that collects business information for a plurality of entities;

matching information associated with the at least one entity with information associated with an entity stored in the at least one database; and assigning the industry code associated with the at least one payroll record as an industry code associated with the matched entity stored in the at least one database.

20. The employment level calculator of claim 19, wherein the at least one database includes NAICS codes and associated company information.

21. The employment level calculator of claim 18, wherein the industry code is selected from among one of the codes established by the North American Industry Classification System (NAICS).

22. The employment level calculator of claim 11, wherein calculating the regression coefficient comprises:

determining at least one matched sample growth rate associated with the normalized first set of payroll data;

determining a weighted average of historical growth rates of employment based on Quarterly Census of Employment and Wages (QCEW) compiled by the Bureau of Labor and Statistics (BLS);

determining a weighted average of historical growth rates of employment based on the at least one matches sample growth rate associated with the normalized first set of payroll data;

determining a difference between a BLS employment growth estimate and a corresponding historical average of employment growth rate for each of a predetermined number of previous months; and determining initial unemployment claims filed during a portion of a time period associated with the first set of payroll data.

23. A non-transitory computer-readable medium for use on a computer system, the computer-readable medium having computer-executable instructions for performing a method comprising:

receiving, at a processor, a first set of payroll data that includes at least one payroll record associated with at least one entity;

determining, at the processor, a format associated with the at least one payroll record of the first plurality of payroll data;

normalizing, at the processor, the format associated with the at least one payroll record of the first plurality of payroll data to conform to a format associated with a second set of payroll data;

calculating, at the processor, a regression coefficient associated with the normalized first set of payroll data, wherein the regression coefficient comprises a value indicative of a difference in growth rates between the first set of payroll data and the second set of payroll data, and is based, at least in part, on a number of unemployment claims filed during a predetermined period associated with the first set of payroll data; and estimating, at the processor, an employment level based on the first set of normalized payroll data and the regression coefficient.

24. An apparatus for predicting an employment level comprising:

a receiving component, implemented on at least one processor, configured to receive a first set of payroll data that includes at least one payroll record associated with at least one entity;

a normalization component, implemented on the at least one processor, configured to:

identify a format associated with the at least one payroll record of the first plurality of payroll data; and normalize the format associated with the at least one payroll record of the first plurality of payroll data to conform to a format associated with a second set of payroll data;

a regression coefficient calculation component, implemented on the at least one processor, configured to calculate a regression coefficient associated with the normalized first set of payroll data, wherein the regression coefficient comprises a value indicative of a difference in growth rates between the first set of payroll data and the second set of payroll data, and is based, at least in part, on a number of unemployment claims filed during a predetermined period associated with the first set of payroll data; and an estimation component, implemented on the at least one processor, configured to predict an employment level based on the first set of normalized payroll data and the regression coefficient.

25. The apparatus of claim 24, wherein the normalization component includes a component configured to invoke a process, comprising:

selecting, at the at least one processor, a day of a first period; and determining, at the at least one processor, whether the at least one payroll record includes the selected day of the first period, if the at least one payroll record includes the selected day of the first period:

use the at least one payroll record in estimating the employment level for the first period;

if the at least on payroll record does not include the selected day of the first period and is for a period after the selected day of the first period:

interpolate payroll data associated with the at least one payroll record and payroll data associated with a previous period payroll record to estimate payroll data corresponding to the selected day of the first period; and use the interpolated data record in determining the employment level associated with the first period; and if the employment data record does not include the selected day of the first period and is for time before the selected day of the first period:

interpolate, in a second period following the first period, payroll data associated with the second period and payroll data associated with the at least one payroll record;

revise the at least one payroll record in accordance with the interpolation; and use the revised at least one payroll record in determining the employment level for the second period.

26. A computer program product comprising a computer usable medium having computer readable code embodied therein for predicting an employment level, comprising:

instructions for receiving a first set of payroll data that includes at least one payroll record associated with at least one entity;

instructions for normalizing the first set of payroll data configured to:

identify a format associated with the at least one payroll record of the first plurality of payroll data; and normalize the format associated with the at least one payroll record of the first plurality of payroll data to conform to a format associated with a second set of payroll data;

instructions for calculating a regression coefficient associated with the normalized first set of payroll data, wherein the regression coefficient comprises a value indicative of a difference in growth rates between the first set of payroll data and the second set of payroll data, and is based, at least in part, on a number of unemployment claims filed during a predetermined period associated with the first set of payroll data; and instructions for predicting an employment level based on the first set of normalized payroll data and the regression coefficient.

* * * * *

UNITED STATES PATENT AND TRADEMARK OFFICE
CERTIFICATE OF CORRECTION

| | |
|---|---|
| PATENT NO. | : 8,346,586 B1 |
| APPLICATION NO. | : 12/640519 |
| DATED | : January 1, 2013 |
| INVENTOR(S) | : Joel L. Prakken and Benjamin T. Herzon |

It is certified that error appears in the above-identified patent and that said Letters Patent is hereby corrected as shown below:

Claim 10, col. 19, line 61, "at least one matches sample" should read --at least one matched sample--.

Claim 25, col. 22, line 54, "at least on payroll record" should read --at least one payroll record--.

Signed and Sealed this
Nineteenth Day of February, 2013

Teresa Stanek Rea
*Acting Director of the United States Patent and Trademark Office*